United States Patent
Chang et al.

(10) Patent No.: US 7,145,753 B1
(45) Date of Patent: Dec. 5, 2006

(54) HEAD STACK ASSEMBLY WITH INSULATED WIRING EXTENDING BETWEEN ACTUATOR COIL AND ACTUATOR MAIN BODY SECTION DISPOSED IN LATERAL WIRING PROTECTOR EXTENDING FROM ACTUATOR BODY

(75) Inventors: Ken L. Chang, Saratoga, CA (US); Kamran Oveyssi, San Jose, CA (US); Shawn E. Casey, San Jose, CA (US); Chaw-Wu Tseng, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 437 days.

(21) Appl. No.: 10/846,036

(22) Filed: May 15, 2004

(51) Int. Cl.
*G11B 5/55* (2006.01)
(52) U.S. Cl. .................................. 360/264.2
(58) Field of Classification Search .............. 360/264.2
See application file for complete search history.

(56) References Cited

U.S. PATENT DOCUMENTS

| | | | | |
|---|---|---|---|---|
| 5,646,800 | A * | 7/1997 | Mihara et al. | 360/97.01 |
| 5,940,252 | A * | 8/1999 | Patterson | 360/264.2 |
| 7,009,815 | B1 * | 3/2006 | Hayakawa et al. | 360/264.2 |

* cited by examiner

*Primary Examiner*—A. J. Heinz

(57) ABSTRACT

A head stack assembly for a disk drive. The head stack assembly includes an actuator body defining an axis of rotation. The actuator body includes a main body section and a coil support portion extending from the main body section. The head stack assembly further includes an actuator coil supported by the coil support portion. The head stack assembly further includes insulated wiring extending between the actuator coil and the main body section in a direction orthogonal to the axis of rotation. The head stack assembly further includes a lateral wiring protector disposed laterally about the insulated wiring and extending from the main body section in a direction parallel to the axis of rotation. The lateral wiring protector includes an open channel with the insulated wiring disposed within the open channel.

18 Claims, 5 Drawing Sheets

HEAD STACK ASSEMBLY WITH INSULATED WIRING EXTENDING BETWEEN ACTUATOR COIL AND ACTUATOR MAIN BODY SECTION DISPOSED IN LATERAL WIRING PROTECTOR EXTENDING FROM ACTUATOR BODY

BACKGROUND OF THE INVENTION

1. Field of the Invention

The present invention relates generally to disk drives, and in, particular to a disk drive including a head stack assembly with insulated wiring extending between an actuator coil and an actuator main body section disposed in a lateral wiring protector extending from the actuator body.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base and supports a lowermost one of the disks. The head stack assembly has an actuator assembly having at least one air bearing slider, typically several, for reading and writing data from and to the disk. Each slider includes a transducer head for reading and writing data. The printed circuit board assembly includes a servo control system in the form of a disk controller for generating servo control signals. The head stack assembly is controllably positioned in response to generated servo control signals from the disk controller. In so doing, the attached sliders are controllably moved relative to tracks disposed upon the disk for reading and writing operations.

The head stack assembly includes an actuator assembly, at least one head gimbal assembly, and a flex circuit assembly. A conventional "rotary" or "swing-type" actuator assembly typically includes an actuator having an actuator body. The actuator body is configured to rotate on a pivot assembly between limited positions about an axis of rotation. The actuator body includes a main body section. One or more actuator arms extend from one opposite side of the main body section. A head gimbal assembly is distally attached to each of the actuator arms. A head gimbal assembly includes an air bearing slider that is attached to a suspension with a gimbal. The suspension resiliently supports the air bearing slider above the tracks of the disk during operation of the disk drive facilitating the slider to "fly" above the disk.

A coil is supported by a coil support that extends from an opposite side of the main body section. The coil is configured to interact with one or more permanent magnets to form a voice coil motor. The coil is disposed in electrical communication with the disk controller through a flex circuit assembly. Controlled movement of the head stack assembly is achieved by selectively energizing the coil with the generated servo control signals.

The flex circuit assembly is configured (1) to supply current to the actuator coil from the printed circuit board assembly and (2) to carry signals between the transducer heads and the printed circuit board assembly. The flex circuit assembly includes a flex cable (also referred to as a flex circuit cable or flex circuit), an integrated circuit device, and a cable connector.

The flex cable includes a plurality of conductive traces embedded within the flex cable that terminate at the cable connector which is electrically connected to the printed circuit board assembly. The flex cable further includes a base film and a cover which are typically formed of a polyimide material. The plurality of conductive traces is disposed between the base and cover films. Insulated wiring extends along each actuator arm to each transducer head for transmitting data signals to and from the transducer heads. Such insulated wiring is connected to the flex cable.

In addition, an electrical connection is made between the coil and the conductive traces of the flex cable. This typically takes the form of a short segment that extends along a bottom surface of the actuator body. This electrical connection may take a variety of forms. For example, a section of flex material similar in construction to the flex cable may be used. Such a section would lie flat against the actuator main body section, and secured in place with an adhesive. Such flex material is considered relatively expensive. Alternatively, insulated wiring may be used which is considered to be relatively less expensive. However, because such wiring does not have a comparable flat profile like the flex material, there is a concern that during handing and installation of the actuator the insulated wiring may become dislodged or loosened thereby interfering with the intended electrical connection.

As can be appreciated, there is a need in the art for an improved head stack assembly configuration in comparison to the prior art.

SUMMARY OF THE INVENTION

According to an aspect of the present invention, there is provided a head stack assembly for a disk drive. The head stack assembly includes an actuator body defining an axis of rotation. The actuator body includes a main body section and a coil support portion extending from the main body section. The head stack assembly further includes an actuator coil supported by the coil support portion. The head stack assembly further includes insulated wiring extending between the actuator coil and the main body section in a direction orthogonal to the axis of rotation. The head stack assembly further includes a lateral wiring protector disposed laterally about the insulated wiring and extending from the main body section in a direction parallel to the axis of rotation. The lateral wiring protector includes an open channel with the insulated wiring disposed within the open channel.

According to various embodiments, the lateral wiring protector may be integrally formed with the main body section. The lateral wiring protector and the actuator body may be formed of a metal material. The lateral wiring protector may be a punched feature formed in the main body section. The lateral wiring protector may be a stamped feature formed in the main body section. The lateral wiring protector may be a machined feature formed in the main body section. The lateral wiring protector may include multiple protrusions extending from the main body section. The open channel may be formed between the multiple protrusions. The insulated wiring may be interwoven between the multiple protrusions. The insulated wiring may be glued to the main body section. The insulated wiring may be glued to the lateral wiring protector. The lateral wiring protector may be formed of a plastic material. The lateral wiring protector may be formed of overmolded plastic and the main body section may be formed of a metal material. The open channel may take the form of an elongate depression with the insulated wiring disposed in the elongate depression. The actuator coil and the insulated wiring may be integrally formed. The open channel may define a depth at least half a thickness of the insulated wiring.

According to another aspect of the present invention there is provided a disk drive. The disk drive includes a disk drive base and the head stack assembly rotatably coupled to the disk drive base. The head stack assembly is as described above.

DESCRIPTION OF THE PREFERRED EMBODIMENTS

Figure 1:
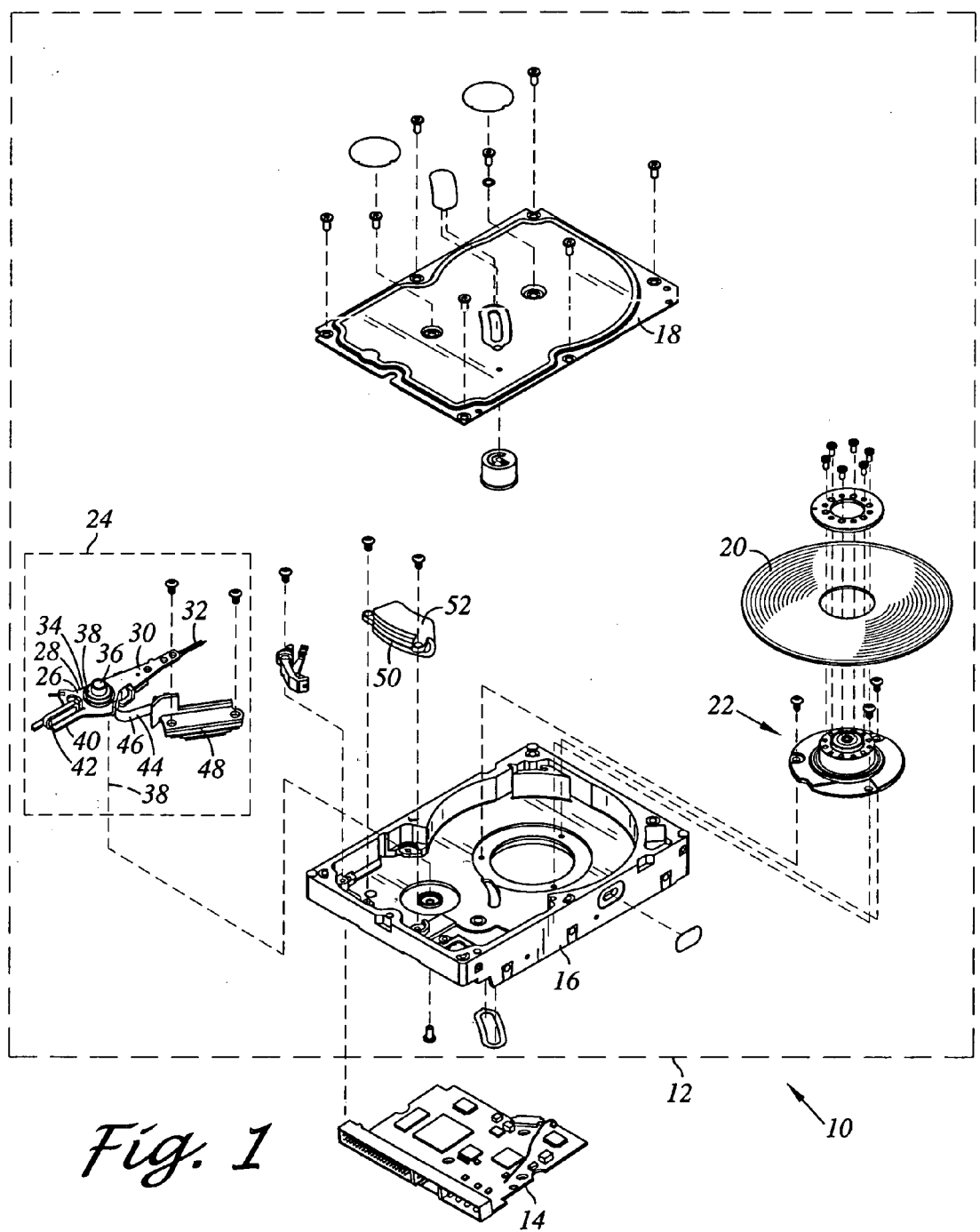
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1–8 illustrate a head stack assembly and a disk drive in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a magnetic disk 20. The disk 20 contains a plurality of tracks for storing data. The head disk assembly 12 further includes a spindle motor 22 for rotating the disk 20. The head disk assembly 12 further includes a head stack assembly 24 rotatably attached to the disk drive base 16 in operable communication with the disk 20. The head stack assembly 24 includes a rotary actuator 26.

The actuator 26 includes an actuator body 28 and an actuator arm 30 that extends from the actuator body 28. It is contemplated that additional actuator arms 30 may be provided. Distally attached to the actuator arm 30 is a head gimbal assembly 32. The head gimbal assembly 32 includes a slider. The slider includes a transducer head. The actuator body 28 includes a main body section 34 that includes a bore. The actuator 26 further includes a pivot bearing cartridge 36 engaged within the bore for facilitating the actuator body 28 to rotate between limited positions about an axis of rotation 38. The main body section 34 further includes a coil support portion 40 that supports an actuator coil 42.

The head stack assembly 24 further includes a flex circuit assembly 44 including a flex cable 46 and a cable connector 48. The cable connector 48 is attached to the disk drive base 16 and is disposed in electrical communication with the printed circuit board 14. The flex circuit assembly 44 supplies current to the actuator coil 42 and carries signals between the transducer head and the printed circuit board assembly 14. A voice coil magnet 50 is supported by a yoke 52 which is coupled to the disk drive base 16. The actuator coil 42 interacts with the magnet 50 to form a voice coil motor for controllably rotating the actuator 26. It is noted that while the actuator coil 42 is shown in a vertical coil configurations, other configurations of the actuator coil 42 and yoke 52 may be chosen from those which are well known to one of ordinary skill in the art.

Figure 2:
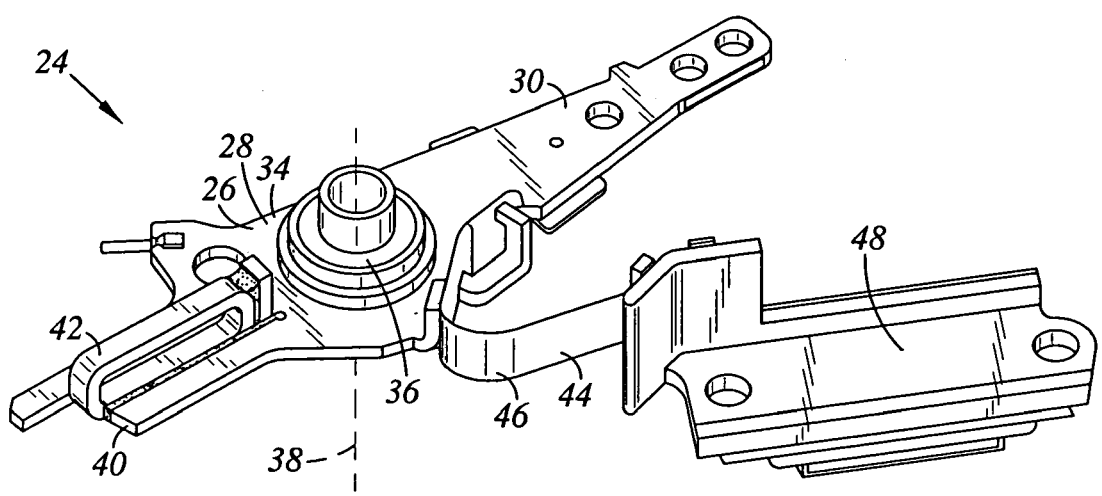
FIG. 2 is an enlarged top perspective view of a head stack assembly of FIG. 1.
Figure 3:
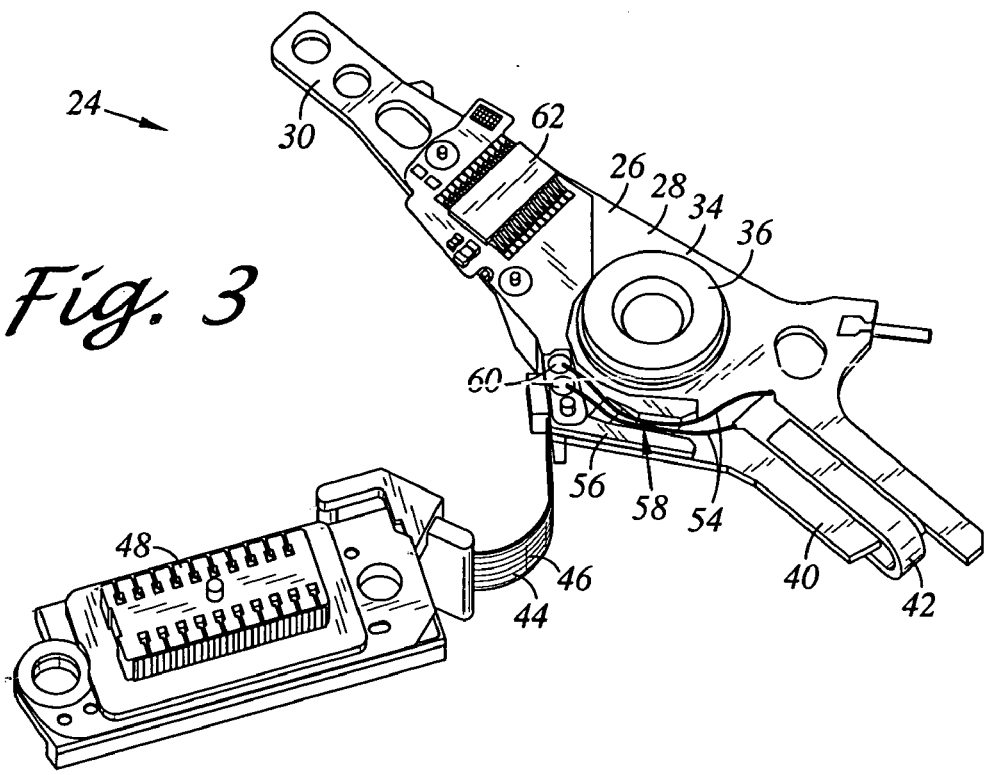
FIG. 3 is a bottom perspective view of the head stack assembly FIG. 2 including the lateral wiring protector with insulated wiring.
Figure 4:
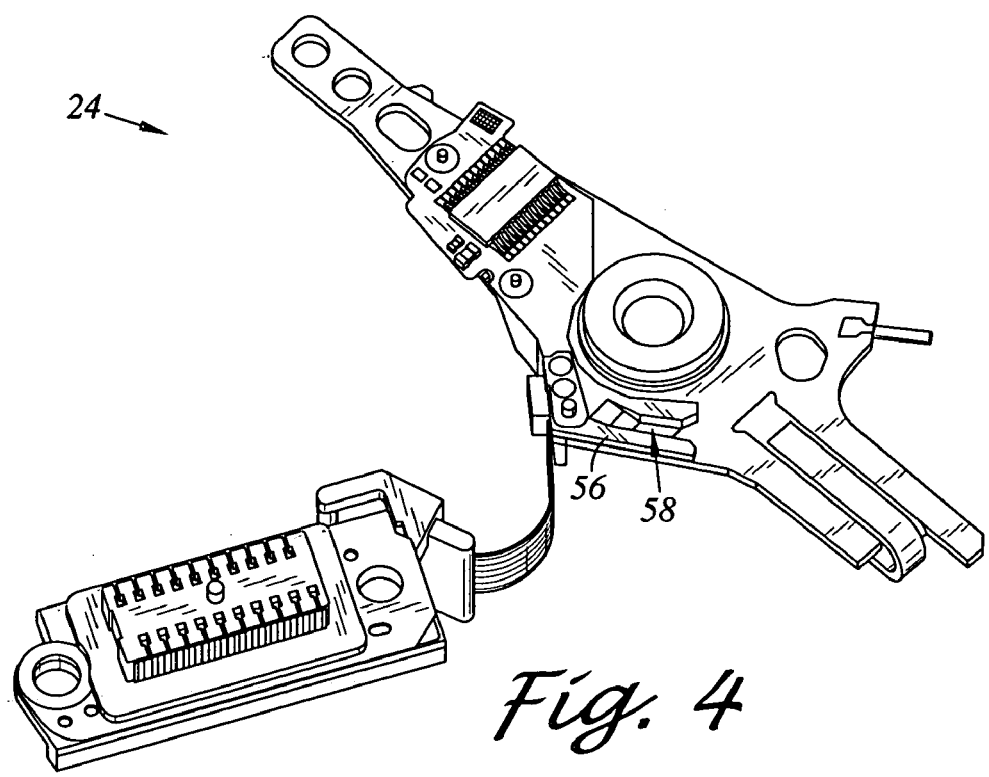
FIG. 4 is the head stack assembly of FIG. 3, however, without the insulated wiring shown.

As depicted in FIG. 2 there is shown an enlarged top perspective view of a head stack assembly 24 of FIG. 1. FIG. 3 is a bottom perspective view of the head stack assembly 24 of FIG. 2. According to an aspect of the present invention, there is provided the head stack assembly 24 for the disk drive 10. The head stack assembly 24 includes the actuator body 28 defining the axis of rotation 38. The actuator body 28 includes the main body section 34 and the coil support portion 40 extending from the main body section 34. The head stack assembly 24 further includes the actuator coil 42 supported by the coil support portion 40. The head stack assembly 24 further includes insulated wiring 54 extending between the actuator coil 42 and the main body section 34 in a direction orthogonal to the axis of rotation 38. The head stack assembly 24 further includes a lateral wiring protector 56 disposed laterally about the insulated wiring 54 and extending from the main body section 34 in a direction parallel to the axis of rotation 38. The lateral wiring protector 56 includes an open channel 58 with the insulated wiring 54 disposed within the open channel 58. The open channel 58 may be best seen in FIG. 4. FIG. 4 depicts the head stack assembly 24 of FIG. 3, however, without the insulated wiring 54 shown.

The lateral wiring protector 56 is contemplated to aid in protecting the insulated wiring 54, such as during handling and installation of the actuator 26. As such, the lateral wiring protector 56 provides some degree of physical shielding of the insulated wiring 54 from unwanted physical contact. This allows the use of insulated wiring 54 which may take the form of common wiring having a generally circular cross-section that may be susceptible to loosening as a result of contact, despite being glued in place. Such common wiring is contemplated to be relatively inexpensive and easy to install.

In the embodiment shown, the actuator body 28 may be formed of a single integrated piece of material. In this regard, the main body section 34 and the coil support portion 40 may be integrally formed. The actuator body 28 may be formed of a stamped material. In this embodiment, the actuator body 28 is shown as being integrally formed with the actuator arm 30. The lateral wiring protector 56 may be formed of another material such as plastic. In this regard, the lateral wiring protector 56 may take the form of overmolded plastic. The open channel 58 may take the form of an elongate depression as shown. The insulated wiring 54 is disposed in the elongate depression. Though not required, in order to provide further protection, the open channel 58 is preferred to define a depth at least half a thickness of the insulated wiring 54. It is contemplated that the actuator coil 42 and the insulated wiring 54 may be integrally formed. The insulated wiring 54 may be electrically connected to the flex cable 46 at terminal pads 60 of the flex cable 46. The insulated wiring 54 may be secured by being glued to the lateral wiring protector 56.

In the embodiment shown, the flex cable 46 extends along the main body section 34 and further extends along the actuator arm 30. In this regard, a portion of the flex cable 46 is oriented orthogonal to the axis of rotation 38. It is contemplated that the flex cable 46 may be mounted to the actuator 26 according to other mounting configurations known to those well known to one of ordinary skill in the art. The flex cable 46 may include a pre-amp 62.

Figure 5:
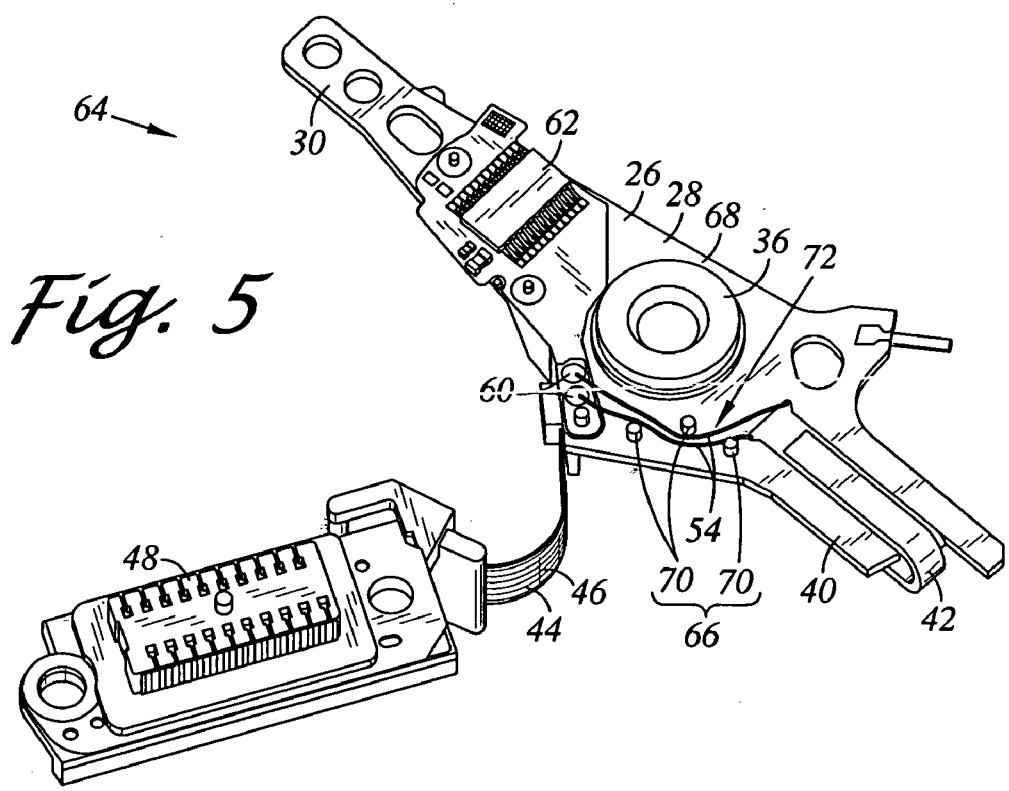
FIG. 5 is a view similar to that of FIG. 3, however, according to another embodiment.
Figure 6:
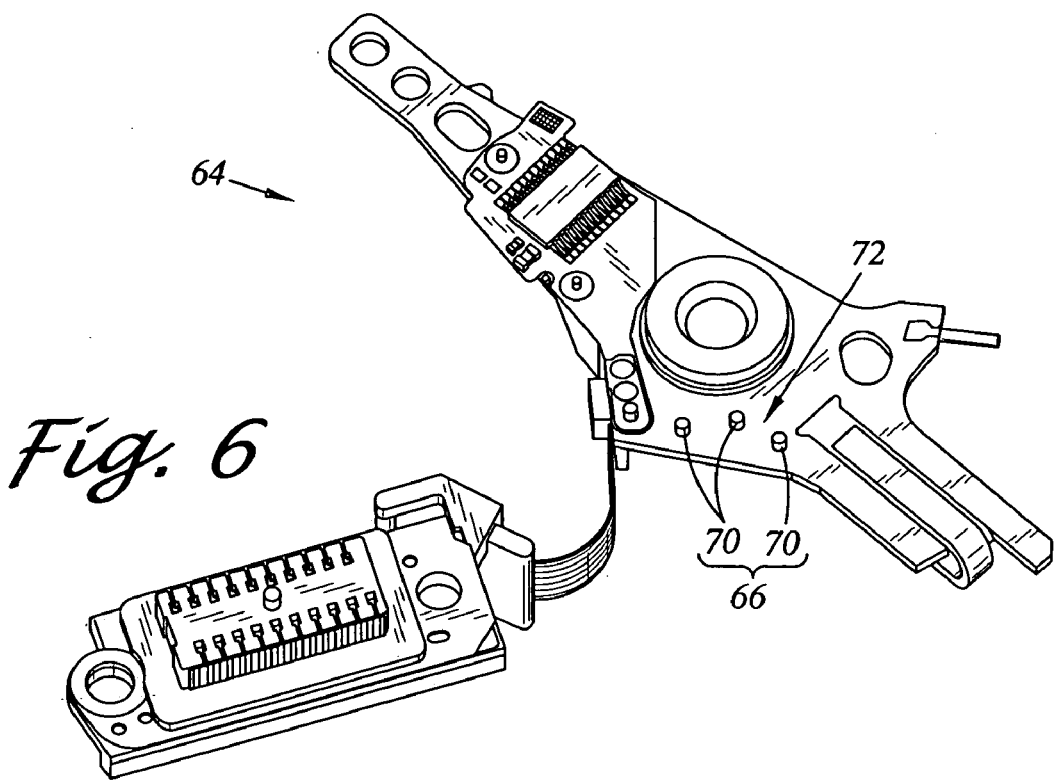
FIG. 6 is the head stack assembly of FIG. 5, however, without the insulated wiring shown with the lateral wiring protector.

Referring now to FIG. 5, there is depicted a view similar to that of FIG. 3, however, according to another embodiment of a head stack assembly 64. FIG. 6 depicts th head stack assembly 64 without the insulated wiring 54 shown. The head stack assembly 64 is similar in construction as the head stack assembly 24, however, with the differences noted below. In this embodiment, there is provided a lateral wiring protector 66 that is integrally formed with a main body section 68. In this regard, the lateral wiring protector 66 and the actuator body 28 may be formed of a metal material. The lateral wiring protector 66 may be a punched, stamped or machined feature formed in the main body section 68. The lateral wiring protector 66 may include multiple protrusions 70 extending from the main body section 68. An open channel 72 is formed between the multiple protrusions 70. The insulated wiring 54 may be interwoven between the multiple protrusions 70 in the open channel 72. The insulated wiring 54 may be glued to the main body section 68.

Figure 7:
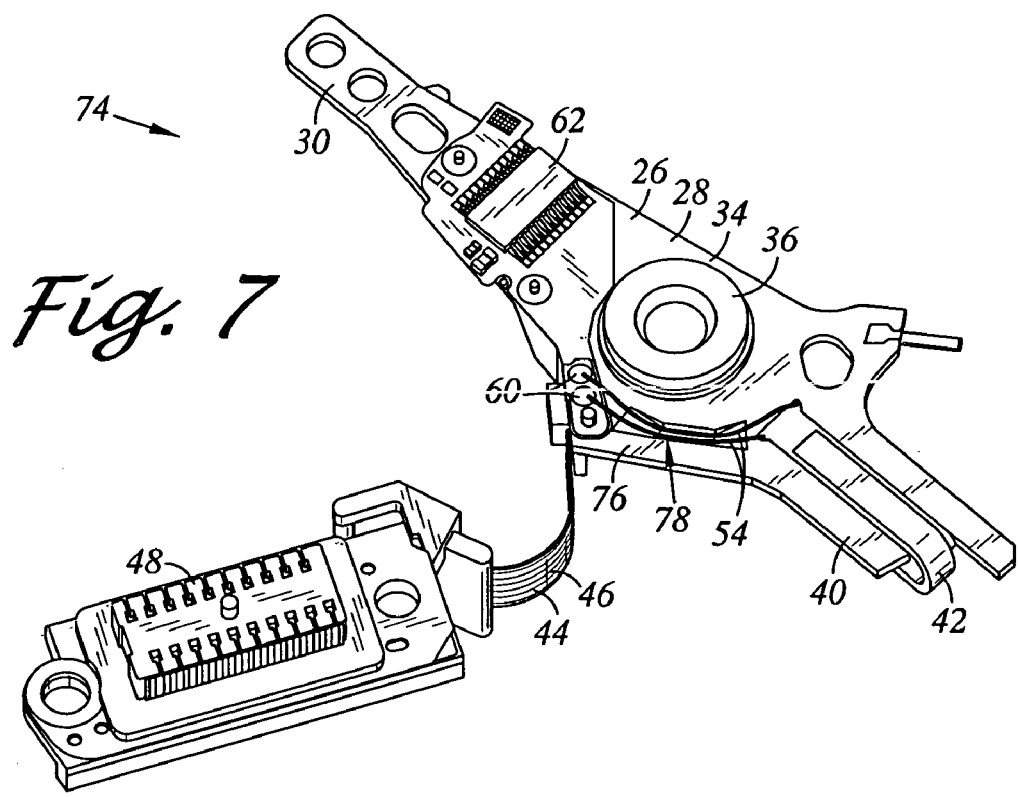
FIG. 7 is a view similar to that of FIG. 3, however, according to another embodiment.
Figure 8:
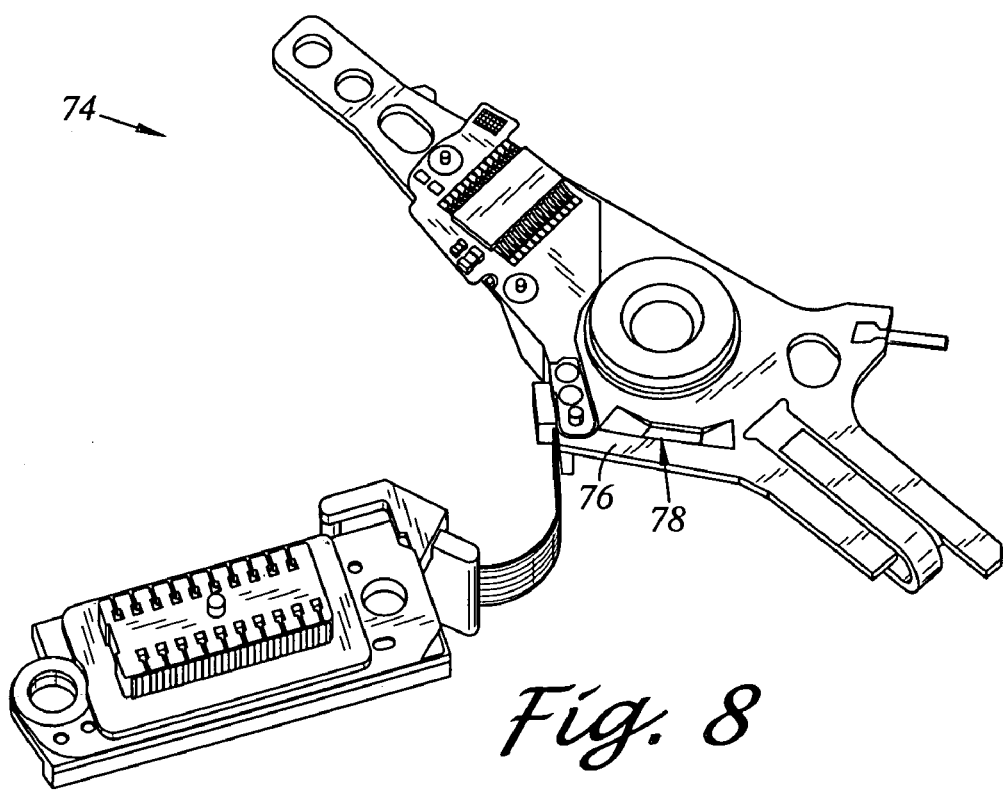
FIG. 8 is the head stack assembly of FIG. 7, however, without the insulated wiring shown with the lateral wiring protector.

Referring now to FIG. 7, there is depicted a view similar to that of FIG. 3, however, according to another embodiment of a head stack assembly 74. FIG. 8 depicts the head stack assembly 74 without the insulated wiring 54 shown. The head stack assembly 74 is similar in construction as the head stack assembly 24, however, with the differences noted below. In this embodiment, there is provided a lateral wiring protector 76 that is integrally formed with a main body section 68. In this regard, the lateral wiring protector 76 and the actuator body 28 may be formed of a metal material. As such, the lateral wiring protector 76 is a portion of the actuator body 28 itself. The lateral wiring protector 76 may be a punched, stamped or machined feature formed in the main body section 68. The lateral wiring protector 76 may define an open channel 78 in the form of an elongate depression. The insulated wiring 54 is disposed in the open channel 78. The insulated wiring 54 may be glued to the main body section 68.

According to another aspect of the present invention, there is provided the disk drive 10. The disk drive 10 includes the disk drive base 16 and the head stack assembly 24 rotatably coupled to the disk drive base 16. The head stack assembly 24 is as described above.

We claim:

1. A head stack assembly for a disk drive, the head stack assembly comprising:
    an actuator body defining an axis of rotation, the actuator body including a main body section and a coil support portion extending from the main body section;
    an actuator coil supported by the coil support portion;
    insulated wiring extending between the actuator coil and the main body section in a direction orthogonal to the axis of rotation; and
    a lateral wiring protector disposed laterally about the insulated wiring and extending from the main body section in a direction parallel to the axis of rotation, the lateral wiring protector including an open channel with the insulated wiring disposed within the open channel.

2. The head stack assembly of claim 1 wherein the lateral wiring protector is integrally formed with the main body section.

3. The head stack assembly of claim 2 wherein the lateral wiring protector and the actuator body are formed of a metal material.

4. The head stack assembly of claim 1 wherein the lateral wiring protector is a punched feature formed in the main body section.

5. The head stack assembly of claim 1 wherein the lateral wiring protector is a stamped feature formed in the main body section.

6. The head stack assembly of claim 1 wherein the lateral wiring protector is a machined feature formed in the main body section.

7. The head stack assembly of claim 1 wherein the lateral wiring protector includes multiple protrusions extending from the main body section.

8. The head stack assembly of claim 7 wherein the open channel is formed between the multiple protrusions.

9. The head stack assembly of claim 7 wherein the insulated wiring is interwoven between the multiple protrusions.

10. The head stack assembly of claim 1 wherein the insulated wiring is glued to the main body section.

11. The head stack assembly of claim 1 wherein the insulated wiring is glued to the lateral wiring protector.

12. The head stack assembly of claim 1 wherein the lateral wiring protector is formed of a plastic material.

13. The head stack assembly of claim 12 wherein the lateral wiring protector is formed of overmolded plastic.

14. The head stack assembly of claim 12 wherein the main body section is formed of a metal material.

15. The head stack assembly of claim 1 wherein the open channel takes the form of an elongate depression, the insulated wiring is disposed in the elongate depression.

16. The head stack assembly of claim 1 wherein the actuator coil and the insulated wiring are integrally formed.

17. The head stack assembly of claim 1 wherein the open channel definines a depth at least half a thickness of the insulated wiring.

18. A disk drive comprising:
    a disk drive base;
    a head stack assembly rotatably coupled to the disk drive base, the head stack assembly including:
        an actuator body defining an axis of rotation, the actuator body including a main body section and a coil support portion extending from the main body section;
        an actuator coil supported by the coil support portion;
        insulated wiring extending between the actuator coil and the main body section in a direction orthogonal to the axis of rotation; and
        a lateral wiring protector disposed laterally about the insulated wiring and extending from the main body section in a direction parallel to the axis of rotation, the lateral wiring protector including an open channel with the insulated wiring disposed within the open channel.

* * * * *